F. & N. M. SPRANGER.
DEMOUNTABLE RIM.
APPLICATION FILED JAN. 11, 1912.
1,069,349.
Patented Aug. 5, 1913.
2 SHEETS—SHEET 1.
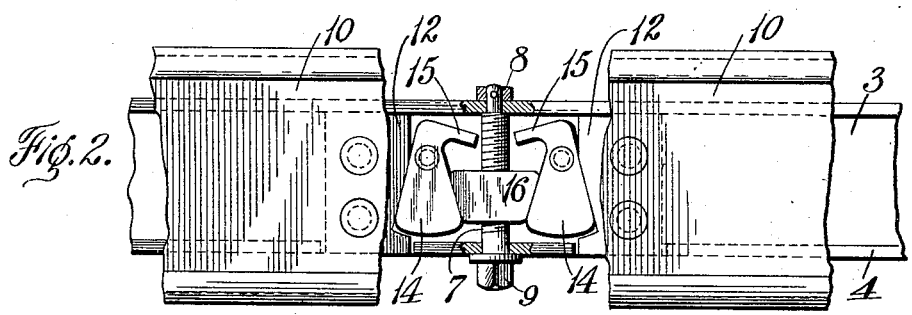
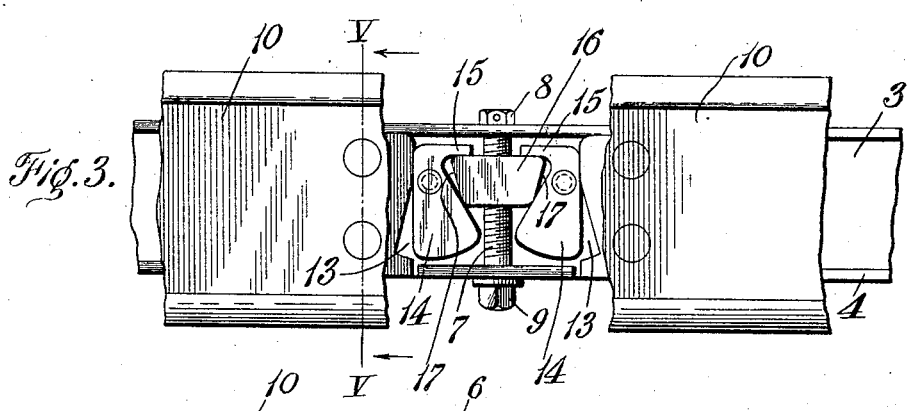
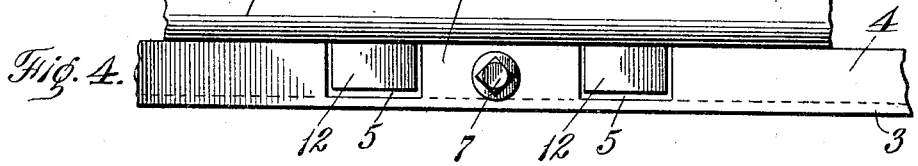
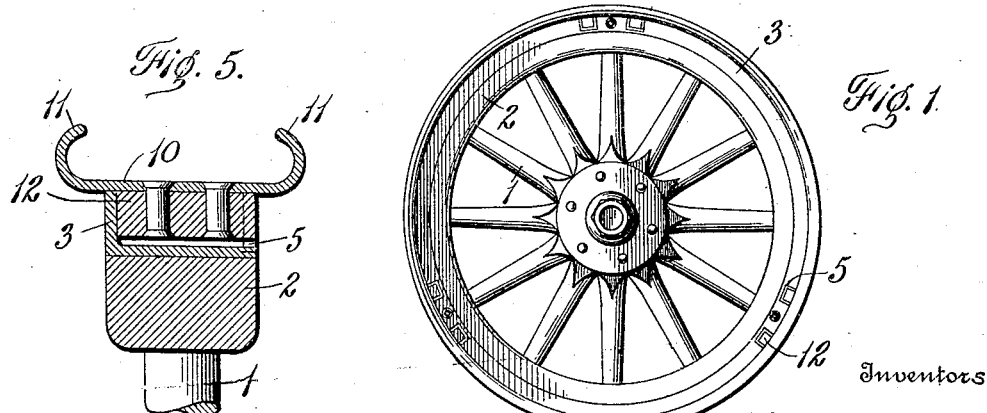
Witnesses
Chas. W. Stauffiger.
A. M. Dorr.
Inventors
Frank Spranger,
Nicholas M. Spranger,
By
Attorneys F. & N. M. SPRANGER.
DEMOUNTABLE RIM.
APPLICATION FILED JAN. 11, 1912.
1,069,349.
Patented Aug. 5, 1913.
2 SHEETS—SHEET 2.
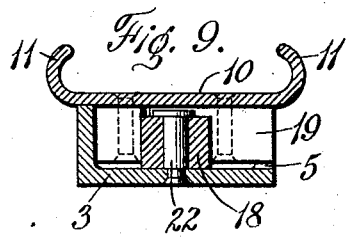
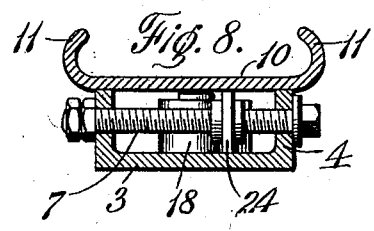
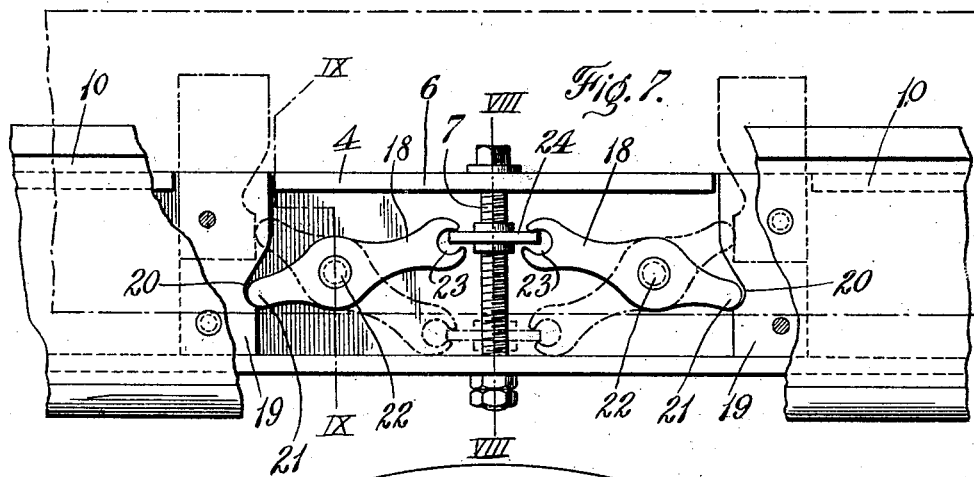
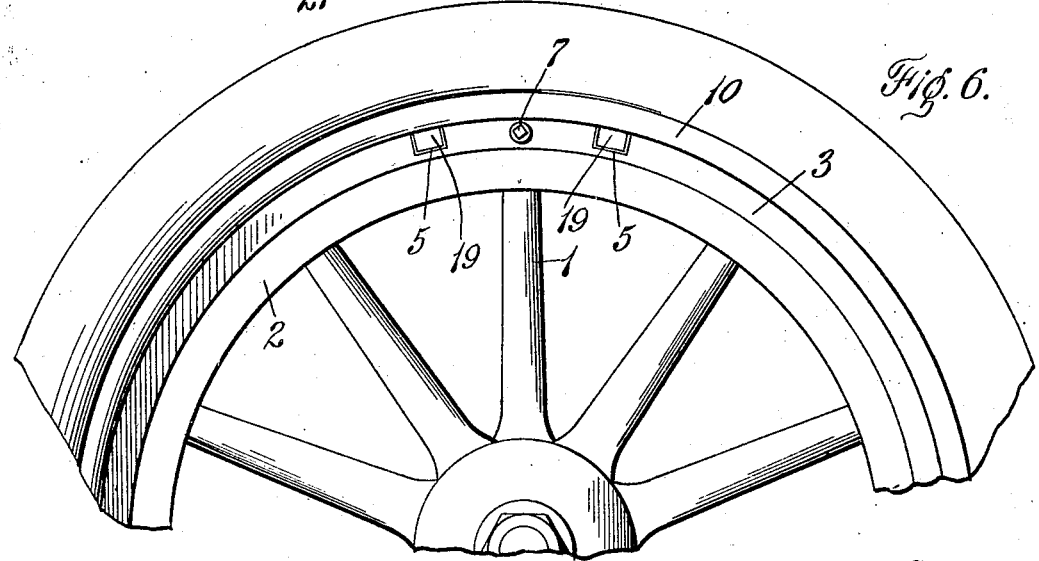
Witnesses
Chas. W. Stauffige.
Anna M. Dorr
Inventor
Frank Spranger,
Nicholas M. Spranger,
By
Attorneys

UNITED STATES PATENT OFFICE.

FRANK SPRANGER AND NICHOLAS M. SPRANGER, OF DETROIT, MICHIGAN.

DEMOUNTABLE RIM.

1,069,349.  Specification of Letters Patent.  Patented Aug. 5, 1913.

Application filed January 11, 1912. Serial No. 670,683.

*To all whom it may concern:*

Be it known that we, FRANK SPRANGER and NICHOLAS M. SPRANGER, citizens of the United States of America, residing at Detroit, in the county of Wayne and State of Michigan, have invented certain new and useful Improvements in Demountable Rims, of which the following is a specification, reference being had therein to the accompanying drawings.

This invention relates to improvements in demountable rims for vehicle wheels and more particularly to means for securing such rims in place and for quickly detaching and removing the same.

The objects of the invention are to provide a simple, compact and quickly operated mechanism for the purpose so arranged as to securely lock the rim in place and aid in its removal, and to provide certain new and useful features in the construction and arrangement of parts.

To these ends the invention consists in the matters hereinafter more fully set forth and more particularly pointed out in the claims reference being had to the accompanying drawings in which—

Figure 1 is a side elevation of a vehicle wheel having in place thereon a rim construction embodying the invention; Fig. 2 is an enlarged detail of a portion of the wheel rim and fastening means, with parts broken away to show the construction and the fastening means in locked position; Fig. 3 is a similar view showing the fastening means in unlocked position; Fig. 4 is a side elevation of the same; Fig. 5 is a transverse section on the line v—v of Fig. 3; Fig. 6 is a side elevation of a wheel with a rim in place thereon embodying a modified construction; Fig. 7 is an enlarged detail of a portion of the rim with parts broken away to show the construction of the locking mechanism; Fig. 8 is a transverse section on the line VIII—VIII of Fig. 7; and Fig. 9 is a transverse section substantially upon line IX—IX of Fig. 7.

As shown in the drawings 1 is a vehicle wheel of any preferred construction having a wood felly 2 and secured in the usual manner upon the wood felly is a channel iron rim 3, one of the side flanges 4 of which is provided with pairs of notches 5 at three or more points around the rim of the wheel. These pairs of notches form between them lugs 6 which in tu h are each provided with an opening forming one bearing for a screwthreaded bolt 7 which extends across the channel rim and has a bearing in the opposite flange thereof. Each of these screw bolts is provided with a nut or head 8 at one end to hold the bolt in place in its bearings and permit the same to turn freely therein and at its opposite end is provided with a squared head 9 for the engagement of a wrench or other tool for turning the bolt.

10 is a demountable rim of the usual form and construction provided with inturned edge flanges 11 to engage and hold a pneumatic or other tire in the usual manner. Riveted or otherwise secured upon the inner face of this demountable rim are blocks 12 arranged in pairs corresponding to the pairs of notches in the flange 4 of the channel rim to slide through said notches when the demountable rim is slipped laterally into place upon the channel rim and to engage said notches when in place and prevent the demountable rim from turning upon the channel rim. These blocks 12 are of such a length that when the demountable rim is in place, they abut at one end the continuous flange of the channel rim and lie within the notches 5 at their opposite ends, thus centering the demountable rim laterally upon the channel rim and preventing it from turning thereon.

Each pair of blocks 12 is formed in their adjacent sides with notches 13 adapted to be engaged by dogs 14 which are pivotally secured intermediate of their ends to the channel rim, one at each side of each screw bolt 7. These dogs are each formed at one end to fit within the corresponding notch 13 in the adjacent block 12 when the detachable rim is in place and at their opposite end are formed with a laterally extending lug 15 adapted to be engaged by a nut 16 upon the screw bolts 7. Each of these nuts 16 is prevented from turning upon the screw bolt by its engagement with the bottom channel rim and it is formed with slanting sides 17 to engage the slanting edges of the dogs and form a wedge to move between the dogs and positively force said dogs to turn upon their pivots laterally each way from the screw bolts into engagement with the notches 13 in the adjacent blocks 12. The movement of the nut 16 in one direction by the turning of the screw bolt, moves its inclined or cam sides into engagement with the sides of the dogs and turns the same into the notches 13, thus turning said dogs within said notches by its wedge action. Upon the movement of the nut 16 in an opposite direction, said nut engages the laterally extending lugs 15 on the dogs and swings said dogs out of the notches 13 toward the screw bolt, unlocking the demountable rim and permitting the same to be removed laterally from the channel rim, the blocks 12 sliding through the notches 5 past the dogs.

In the modified construction shown in Figs. 6 to 9 inclusive, dogs 18 are substituted for the dogs 14 and blocks 19, each having a notch 20 in one edge to be engaged by the rounded end or point 21 of the adjacent dog, are substituted for the blocks 12. These dogs 18 are pivotally secured at 22 to the channel rim to swing therein with the adjacent ends of each pair of dogs close to the screw bolt 7. These ends of the dogs are formed with notches 23 to engage a nut 24 on the screw bolt which nut is prevented from turning upon the bolt by its engagement with the channel rim and is thus moved by the turning of the bolt, across within the channel rim to swing the dogs upon their pivots with their outer ends or points 21 in engagement with the notches 20 in the blocks. When the demountable rim is in place, it is centered upon the channel rim and prevented from turning thereon by the engagement of the blocks with a channel rim and it is locked in place by the engagement of the dogs with the notches in the blocks, said dogs being arranged to swing with their blocks 19, past the longitudinal center line of the rim when the blocks are in place. Upon the opposite movement of the nut 24 and the swinging of the dogs in an opposite direction, the points or ends 21 of the dogs swing past the longitudinal center line of the rim toward the opposite side thereof and by their engagement with the blocks force said blocks outwardly through the notches in the rim flange and thus force the demountable rim laterally from the channel rim. In this construction the demountable rim is not only locked in place upon the channel rim by the dogs but is also positively forced from the channel rim by the movement of the dogs thus greatly facilitating the removal of the demountable rim.

Each pair of locking dogs is positively actuated by its screw bolt and held in locked position thereby. The dogs are also positively actuated by the bolt into unlocked position and thus the operation of the locking mechanism is made positive and accurate.

Having thus fully described my invention what I claim is:—

1. The combination with an inner rim having standing flanges and an outer demountable rim, of a transverse threaded shaft journaled in the standing flanges of the inner rim, pivoted wedge-shaped dogs on the inner rim adapted to be thrust in and out of engagement with the outer rim, and a wedge-shaped nut threaded on the shaft and adapted to move the dogs in and out of engagement with the demountable rim.

2. The combination with an inner rim provided with side flanges, one of which is recessed, and an outer demountable rim with notched transverse members thereon that interlock with the recesses and extend across the face of the inner rim, of a transverse shaft journaled in the flanges between the recesses, a pair of oppositely-disposed dogs pivoted on the inner rim adjacent the shaft and adapted to engage the notches in the adjacent faces of the transverse members, and a nut traveling on the shaft that is adapted to move the dogs in and out of engagement with the notches in the transverse members of the outer rim.

3. The combination with an inner channel rim, one of whose flanges has a pair of recesses and a demountable outer rim having notched transverse members adapted to engage in the recesses, of a transverse shaft journaled in the flanges of the channel between the recesses, a pair of oppositely-disposed dogs pivoted on the inner rim adjacent the shaft and adapted to engage with the notches of the transverse members of the outer rim when moved in one direction, and a wedge nut traveling on the transverse shaft and moving the dogs in and out of engagement with the said members.

In testimony whereof we affix our signatures in presence of two witnesses.

FRANK SPRANGER.
NICHOLAS M. SPRANGER.

Witnesses:
OTTO F. BARTHEL,
C. R. STICKNEY.

---

Copies of this patent may be obtained for five cents each, by addressing the "Commissioner of Patents, Washington, D. C."